United States Patent [19]
Koie et al.

[11] Patent Number: 5,634,708
[45] Date of Patent: Jun. 3, 1997

[54] REAR INDICATING DEVICE FOR AN AUTOMOBILE

[75] Inventors: Kazutoshi Koie, Tokoname; Naoki Fukaya, Tokyo; Yasunori Kanno; Shinji Namba, both of Kariya, all of Japan

[73] Assignee: Nippondenso Co., Ltd., Kariya, Japan

[21] Appl. No.: 73,446

[22] Filed: Jun. 8, 1993

[30] Foreign Application Priority Data

Jun. 9, 1992 [JP] Japan .................................. 4-149555
Dec. 1, 1992 [JP] Japan .................................. 4-322116

[51] Int. Cl.⁶ ........................................................ B60Q 1/26
[52] U.S. Cl. ............................... 362/80.1; 362/26; 362/293
[58] Field of Search ................................ 362/26, 31, 32, 362/61, 80.1, 293; 359/1, 15, 34; 340/479

[56] References Cited

U.S. PATENT DOCUMENTS

| | | | |
|---|---|---|---|
| 4,892,369 | 1/1990 | Moss | 340/479 X |
| 5,101,193 | 3/1992 | Smith et al. | 362/80.1 X |
| 5,106,174 | 4/1992 | Smith | 359/19 |

FOREIGN PATENT DOCUMENTS

| | | |
|---|---|---|
| 1502465 | 8/1989 | Japan . |
| 3121942 | 5/1991 | Japan . |

*Primary Examiner*—Stephen F. Husar
*Attorney, Agent, or Firm*—Cushman, Darby & Cushman IP Group of Pillsbury Madison & Sutro LLP

[57] ABSTRACT

A rear indicator device for an automobile arranged inwardly of and adjacent to a rear window. The device includes a light guide plate 2, a hologram 2 arranged in the light guide plate 2 and an irregular shaped prism having a first section having an apex angle φ1 at which the light beam from a light source 5 is subjected to a refraction so that the light beam is flattened. The flattened beam is again introduced into the prism at a second section which is in face to face contact with the light guide plate 2, so that the light beam is transmitted inside the light guide plate 2 toward the hologram 3, whereat the light beam is introduced into the hologram at a predetermined angle of incidence, so that a horizontal light beam of a predetermined wave length is obtained in a rear direction of the automobile to indicate the braking of the automobile.

12 Claims, 12 Drawing Sheets

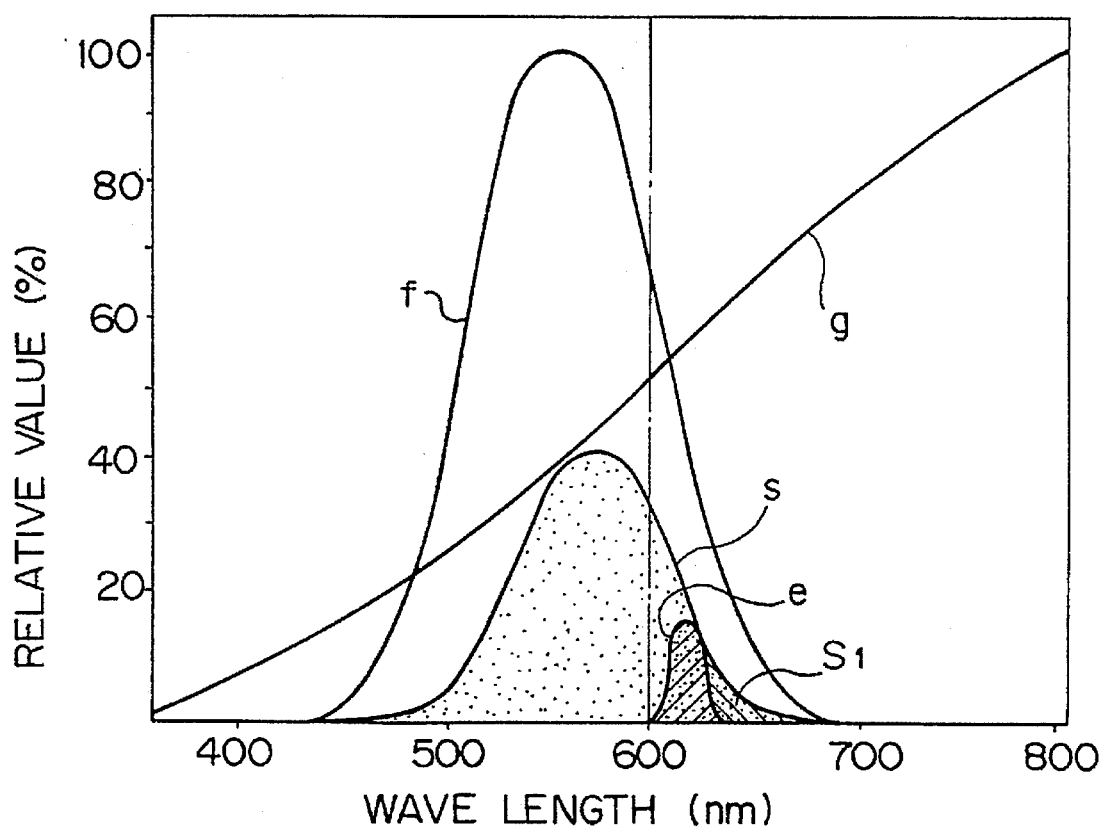

REAR INDICATING DEVICE FOR AN AUTOMOBILE

BACKGROUND OF THE INVENTION

1. Field of the Invention

The present invention relates to a rear indicating device for an automobile, which device is for indicating various situations including, for example, the application of the brakes of the automobile.

2. Description of Related Art

Recently, a so-called high-mount-type stop-lamp system is often employed on automobiles, wherein a stop-lamp is mounted inside the cabin at a position above a rear shelf in the cabin adjacent to the lower side of the rear window. The high-mount-type stop lamp system is effective in making the stop lamp easily recognized by the driver of a car which is following. However, the high mount type stop lamp system is disadvantageous in that the field of view in the rear direction via the new window is reduced by the stop lamp which is mounted in a location above the rear shelf. Furthermore, due to the use of the high-mount-type stop-lamp system, the space above the rear shelf is reduced and an external appearance of the automobile can be disfigured.

Therefore, in order to avoid the above problems, a system has heretofore been proposed, wherein an automobile rear window is, on its inner surface or its inner side, a hologram, onto which a light, from a light source is illuminated to obtain a reproduction of a red reflected light directed rearwardly via the hologram to indicate the application of the brakes. See, for example, the Japanese Unexamined PCT Patent Publication (Kohyo) No. 1-502465 and Japanese Patent Publication (Kokai) No. 3-121942.

In the indication system as disclosed in the first above mentioned patent (1-502465), optical fibers are connected to an edge of the rear window for the introduction of the light for the reproduction. Such a construction is defective in that a light coupling efficiency between the optical fibers and the edges of the rear window is small. In addition, the small area of the edge of the rear window makes it difficult to introduce a sufficiently large amount of light for the reproduction of the hologram into the pane, which causes the brightness of the indication system to be reduced.

In the indication system as disclosed in the second above mentioned patent (Japanese Patent Publication (Kokai) No. 3-121942), in order to introduce the light row reproduction into the rear window, the light source is directly connected to the edge of the rear or a prism is connected to the edge of the rear for introducing the light, from the light source, into the rear window via the prism. This construction, however, is defective in that a large amount of reproduction light cannot be introduced into the rear window, due to the fact the thickness of the window is as small as about 4 mm, which greatly limits the maximum amount of the light to be introduced.

SUMMARY OF THE PRESENT INVENTION

An object of the present invention is provide rear indicating device for an automobile, capable overcoming the above described drawbacks in the prior art.

Another object of the present invention is to provide a rear indicating device capable of introducing a sufficient amount of light into a hologram, irrespective of the limited thickness of the rear window, using a prism.

According to the present invention, a rear indicating device for an automobile is provided, comprising:

a light source for creating a light beam;

a hologram arranged to receive the light beam from the light source;

a guiding plate means formed as a plate made of transparent material of a predetermined thickness, the plate means guiding the light beam from the light source to the hologram for introducing the light beam into the hologram at a desired angle of incidence to emit a light beam from the hologram, which is directed in a predetermined direction, and;

means for flattening the light beam transmitted to the hologram substantially in the direction of the thickness of the guiding plate means.

BRIEF DESCRIPTION OF ATTACHED DRAWINGS

FIG. 21 shows relationship of specific eye sensitivity, spectral distribution, and brightness of the indication light with respect to the wave length.

DESCRIPTION OF PREFERRED EMBODIMENTS

Figure 1:
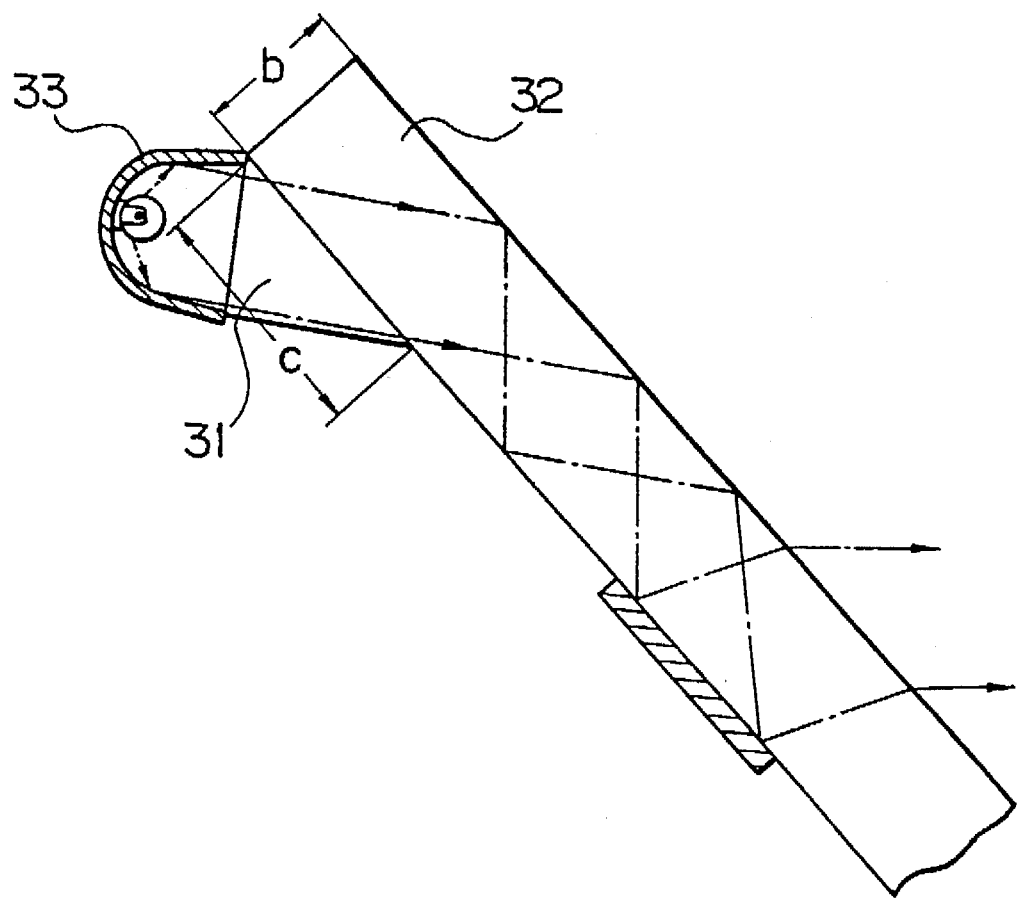
FIG. 1 shows an arrangement of a rear window and a prism in a prior art.

Now, a problem to be solved by the present invention in the prior art will be further explained with reference to FIG. 1, which shows a construction of the Japanese Patent Publication (Kokai) No. 3-121942, where light is introduced into a rear window 32. A prism 31 of a cross sectional shape of a right angled triangle is provided, having a longest side (a hypothenuse of the triangle) which is in face to face contact with an outer surface of the rear window 32. A light source 33 is provided, which omits a light beam directed to a shorter side (a base of the triangle) of the prism 31, from where the light beam is introduced into the rear window 32. However, this construction is defective in that a ratio of the length c of the longest side of the prism 31 to the thickness b of the rear window 32 larger than a predetermined value causes the light introduced into the rear window to be reflected at an inner surface of the rear window which is opposite the inner surface of the rear window adjacent the prism 31. As a result, a size of the prism of the right angled triangle shape, i.e., the length of the longest side c is limited in accordance with the thickness of the rear window 32. In other words, the prism 31 of a larger size can not be used since the thickness of the rear window 32 is limited to about 4 mm. Usually, the length of the side of the prism for introducting light must be smaller than the twice the thickness of the glass plate in order to prevent the light introduced into the plate from being re-introduced into the prism 31. Such a limitation in the size of the prism 31 causes the amount of introduced light to be limited, thereby the brightness of the stop indicator is reduced.

Now, embodiments of the present invention capable of overcoming the above mentioned drawback in the prior art will be explained.

Figure 2:
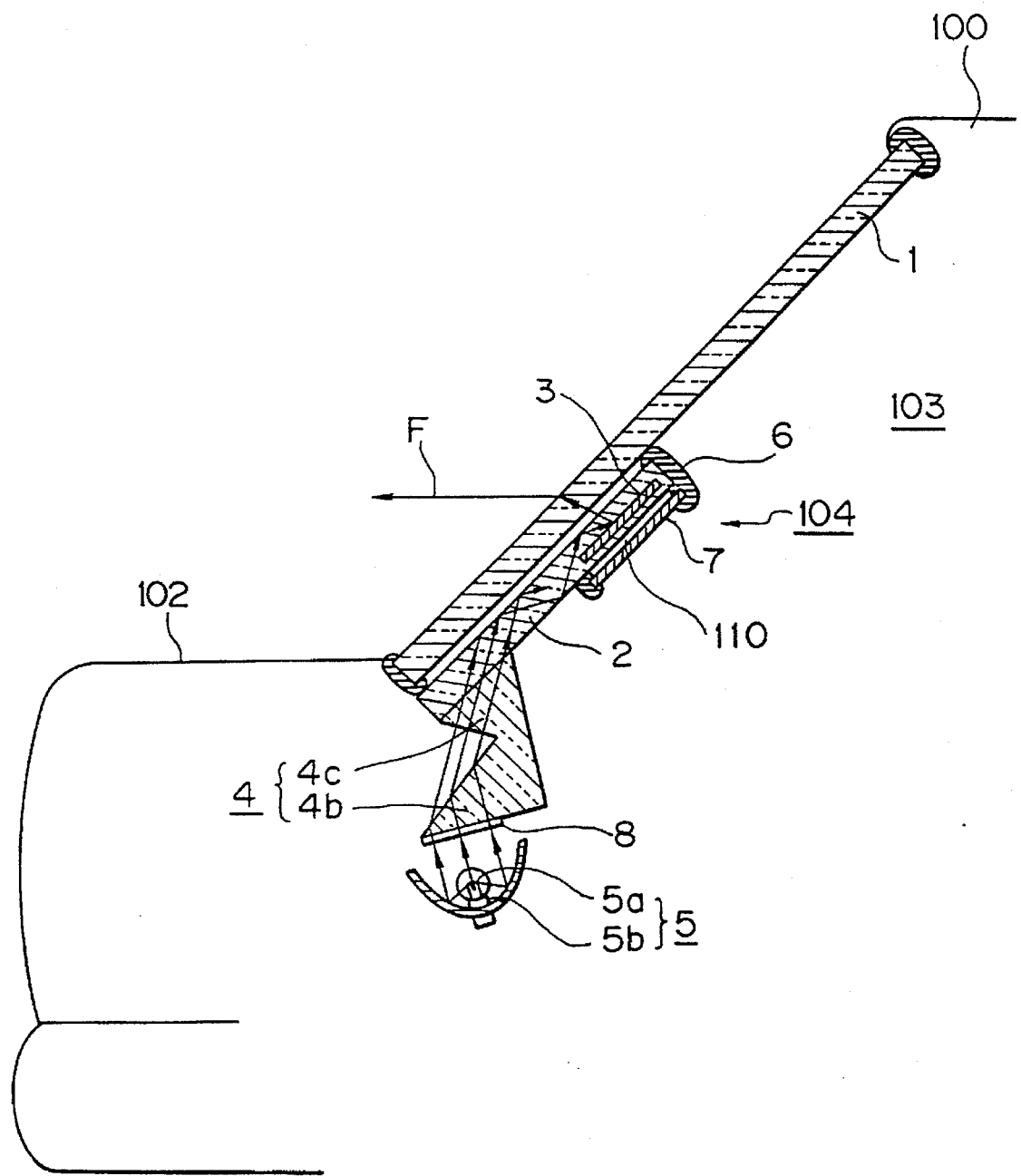
FIG. 2 is a schematic cross-sectional view of the rear part of an automobile showing a rear indicating device according to the present invention.
Figure 3:
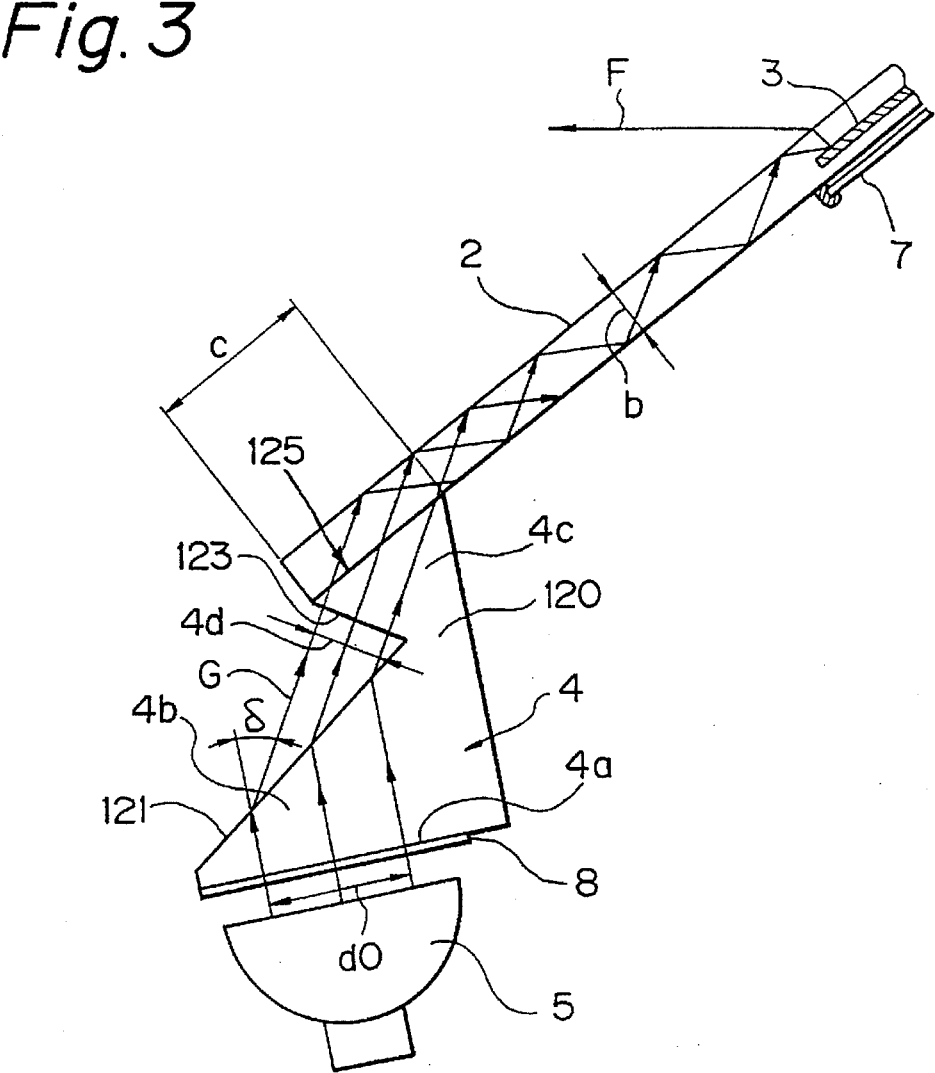
FIG. 3 is an enlarged view showing an arrangement between the prism and the guide plate.

In FIGS. 2 and 3, reference numeral 1 denotes a rear window for an automobile. A reference numeral 100 denotes a roof panel, 102 a trunk lid, and 103 the cabin. A reference numeral 104 generally denotes a rear indicating device according to the present invention, which includes a lightguide plate 2 arranged inside the cabin 103 at a location adjacent the lower end of the rear window 1, a reflection type hologram 3 arranged inside the rear window 1, a light source 5 for generating a beam of a light of a predetermined wave length and of a predetermined angle of incidence as illumination for the hologram 3, and a prism 4 of an irregular cross sectional shape of introducing the light beam into the light guide plate 2. According to the present invention, the introduction of the illuminating light into the hologram 3 causes it to reflect light which is, via the rear window 1, directed rearwardly of the automobile as shown by an arrow F in FIG. 2.

Figure 9:
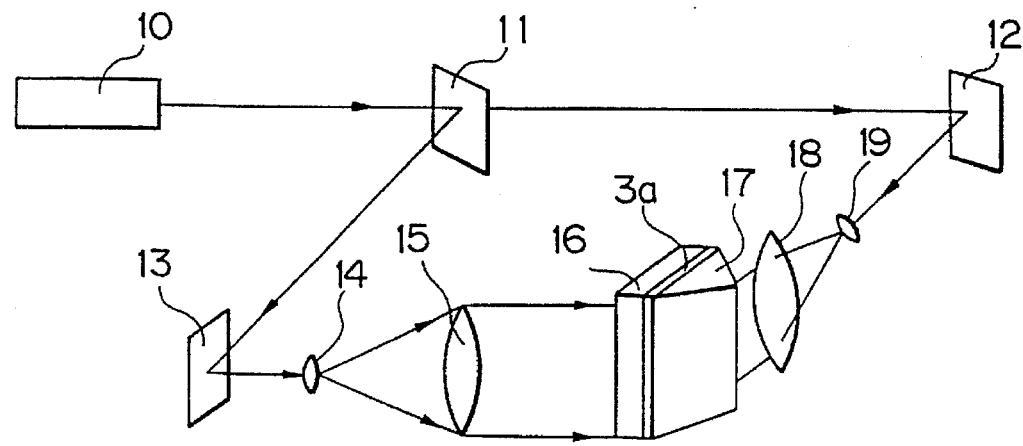
FIG. 9 shows an optical system to produce a hologram.
Figure 10:
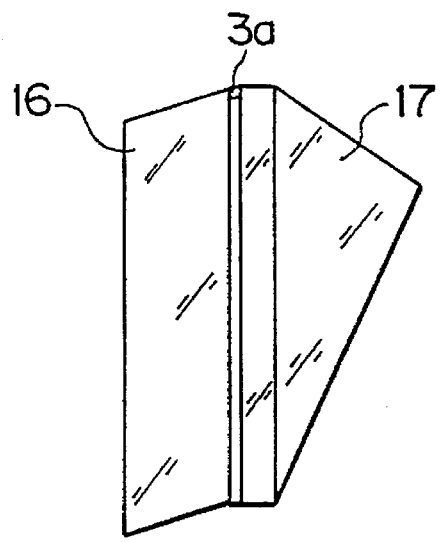
FIG. 10 shows a side view of the prisms 16 and 17 in FIG. 19.

In well known manner, a holographic plate, made as a transparent film with a coating of photosensitive agent on the outer surface of the film is provided, and the plate is exposed to the light of a predetermined wave length, corresponding to, for example, red, in order to obtain a hologram. Namely, in FIG. 9 showing schematically an optical arrangement for obtaining a hologram, a holographic plate 3a is, as shown in FIG. 10, sandwiched between prisms 16 and 17. In FIG. 9, a laser light from a laser 10 is partly reflected at a half-silvered mirror 11, while the remaining part of the laser light passes through the half-silvered mirror 11. The reflected light at the mirror 13 (below, a reference light) is directed, via an object lens 14 and a collimation lens 15, to the prism 16, so that the collimated light is introduced into the plate 3a. However, the light width passed through the half-silvered mirror 11 (below, object light) is reflected at the mirror 12 and is directed to an object lens 19 and a collimation leans 18, so that collimated light is introduced into the plate 3a via the prism 17. Thus, two different light beams from the same light source are combined at the plate 3a, which causes an interference of light to occur at the plate 3a, which causes a hologram 3 to be produced after the developing process.

In a well-known technique, during reproduction of the hologram, the angle of the half mirror 11 with respect to the light beam as introduced thereto can be varied, so that a multi-way exposed hologram is obtained. Such a multi-way exposed hologram is, when used as a rear indicator for an automobile, advantageous in that an increased area of visual recognition from the rear of the automobile can be obtained.

As shown in FIG. 3, the hologram 3 thus produced is embedded in the light guide plate 2.

Figure 7:
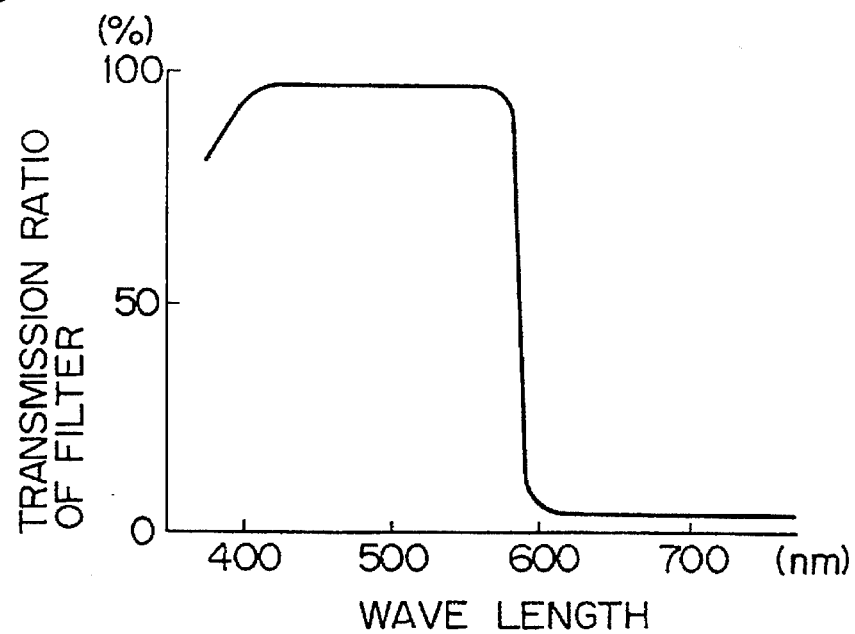
FIG. 7 is the relationship between the wave length and the transmitting of the red cut filter.
Figure 8:
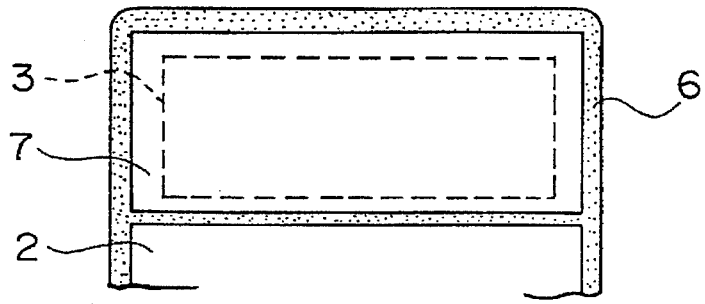
FIG. 8 is a view of the rear indication device.

As an alternative, the hologram 3 is attached to an outer surface of the light guide plate 2 by means of an adhesive agent. As shown in FIG. 2 or 8, a red cut filter plate 7 is arranged on one side of the light guide plate 2 remote from the glass plate 1 by means of a mounting frame member 6, so that a closed gap 110 larger than several μm is created between the surface of the light guide plate 2 and the red cut filter 7. Filled in the closed gap 110 is, for example, water, air or adhesive agent, et al. FIG. 7 illustrates an example of the filter characteristic of the red cut filter 7. Namely, FIG. 7 is a relationship between the wave length of the light introduced into the filter 7 and a light transmission ratio which is a ratio the amount of the light transmitted through the filter to the amount of the light introduced into the filter 7. As will be seen from FIG. 7, the filter 7 can substantially cut the wave length larger than 590 nm. In other word, the filter 7 can transmit only the wave length shorter than 590 nm.

As shown in FIG. 2, the prism 4 of the irregular cross sectional shape is fixed to the inner surface of the rear window at its lower portion. The prism 4 is constructed by an inlet section 4b of a triangle cross sectional shape and an outlet section 4c of a triangle cross sectional shape. These inlet and outlet section 4b and 4c are connected with each other at a location 120. The first section 4b forms with an inlet surface 4a for receiving the laser beam emitted from the light source 5, and an outlet surface 121 which forms an angle of δ with respect to the inlet surface 4a. The second section 4c has an inlet surface 123 which faces the outlet surface 121 of the first section so that these surfaces 121 and 123 converge with each other toward the connecting portion 120, and an outlet surface 125, which forms an angle 42 with respect to the inlet surface 123, and which is in face to face contact with the lower surface of the light guiding plate 2.

As a result of the construction of the irregular shaped prism 4, the light beam introduced into the first section 4a via the inlet surface 4a at a right angle is transmitted to the air from the outlet surface 121, while the direction of the light beam is deflected through an angle δ due to refraction of the light. The light beam thus transmitted from the outlet surface 121 is again introduced into the second section 4c via the inlet surface 123 at a right angle as shown by arrows G. The light beam thus introduced into the second section 4c is directed to the light guide plate 2.

It should be noted that the prism 4 extends along the entire width of the light guide plate 2 which extends along the rear window of a car.

The irregular shaped prism 4 according to the present invention can produce a light beam of a flattened shape which is introduced into the light-guide plate. Namely, the height of the light beam, when it is introduced into the inlet surface 4a of the first section 4a, is $d_0$, while the height of the laser beam, when it is emitted from the surface 121, is d, which is clearly smaller than $d_0$.

The flattened laser beam is introduced into the light guide plate 2 via the second section 4c of the prism 4. As a result of such a flattening of the laser beam, even if the length c of the outlet surface 125 of the second section 4c of the prism 4 is limited so that the ratio of the length c with respect to the thickness of the guide plate b is smaller than a predetermined value. Thus, a relatively large value of the effective length ($d_0$) of the inlet surface 4a of the first section 4a can be maintained. Thus, an re-introduction of a light into the light guide plate 2 from the light guide plate 2 is prevented while introducing an increased amount of the light into the light guide plate from the light source. Namely, a large amount of the air is introduced into the light guide plate 2, irrespective of the shallowness of the light guide plate 2.

Figure 4:
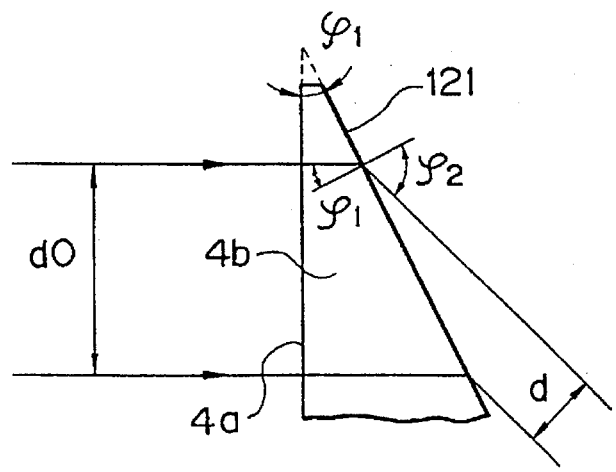
FIG. 4 illustrate a flattening of a light beam by a prism.

According to the present invention, the desired range of the value of the apex angle $\phi 1$ of the first section 4b of the prism 4 should be determined in accordance with the flattening ratio of the light beam emitted from the first section 4b and the reflectivity at the outlet surface 121. Namely, as shown in FIG. 4, the thickness of the emitted light beam d and the exit angle $\phi 2$ of the discharged beam are respectively expressed by the following equations:

$$d = d_0 \times \frac{\cos \phi 2}{\cos \phi 1} = A \times d_0$$

$$\phi 2 = \sin^{-1}(n \times \sin \phi 1),$$

where $d_0$ is the thickness of the laser beam introduced into the inlet surface 4a of the first section 4b of the prism 4, $\phi 1$ is the apex angle of the prism first section 4b, and n is a reflection index of the prism. The exit angle $\phi 2$ is an angle of the light beam discharged from the outlet surface 121 with respect to a line vertical to the surface 121. Now, a flatness ratio is defined by $$\frac{\cos \phi 2}{\cos \phi 1},$$

thus the thickness of the emitted light d becomes $A \times d_0$.

Figure 5:
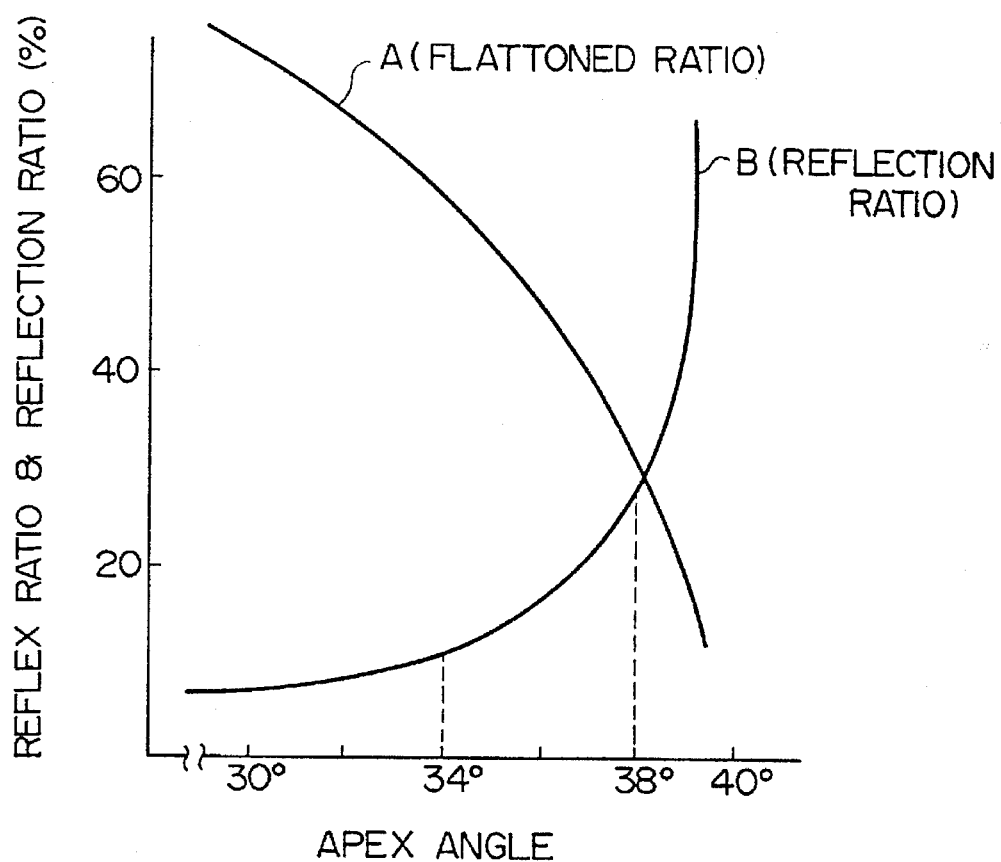
FIG. 5 is relationships of flattening rate of the light beam and a reflection rate with respect to the apex angle.

FIG. 5 shows a relationship between the value of the apex angle $\phi 1$ and the flatness ration A, when the value of the refraction index n is 1.57. As will be easily seen, higher the value of the apex angle $\phi 1$, smaller the flattened ratio, in the area when the value of the apex angle $\phi 1$ is smaller than 40 degree.

A reflectivity B at the outlet surface 121 of the inlet section 4b of the prism 4 when the light is emitted from the surface 121 is expressed by the following equation, $$B = \frac{(RP + RS)}{2},$$

where RP is reflectivity of the P-polarized light, and RS is reflectivity of the S-polarized light. Furthermore, the reflectivity of the S-polarization, RP and the reflectivity of P-polarization, RS are expressed by the following equations, respectively.
and
In FIG. 5, the relationship between the apex $$RP = \left( \frac{\tan(\phi 1 - \phi 2)}{\tan(\phi 1 + \phi 2)} \right)^2$$

$$RS = \left( \frac{\sin(\phi 1 - \phi 2)}{\sin(\phi 1 + \phi 2)} \right)^2$$

angle $\phi 1$ and the reflectivity B is also shown. As will be seen from this relationship, the value of the reflectivity B has a relatively small value when the apex angle $\phi 1$ is smaller than about 38°. Furthermore, a sharp increase in the value of the reflectivity B is obtained when the value of the apex angle $\phi 1$ exceeds about 38°.

It is desirable that the value of the reflectivity B is as small as possible, and that the flattened ratio A of the emitted laser beam is as small as possible. Thus, from the curves in FIG. 5 as to the flattened ratio A of the emitted laser beam and the reflectivity B, it is suitable that the value of the apex angle $\phi 1$ is in a range between 34° to 38°.

As shown in FIG. 3, the outlet section 4c of a cross-sectional shape of a substantially triangular shape of the prism 4 has the plane 123 of incidence which is substantially transverse to the direction G of the light beam as flattened from the inlet section 4a of the prism, so that an effective introduction of the flattened light beam is obtained. As shown in FIG. 3, between the prism 4 and the light source 5, a red pass filter 8 for allowing a transmission of red light is arranged so that the filter 8 is under face to face contact with the inlet surface 4a of the first section 4b of the prism 4. The light source 5 is, as shown in FIG. 2, constructed by a red shaped lamp 5a, such as a fluorescence lamp or discharge lamp 5a, and a parabola shaped mirror 5b for generating a substantially collimated light for a formation of the hologram.

Figure 6:
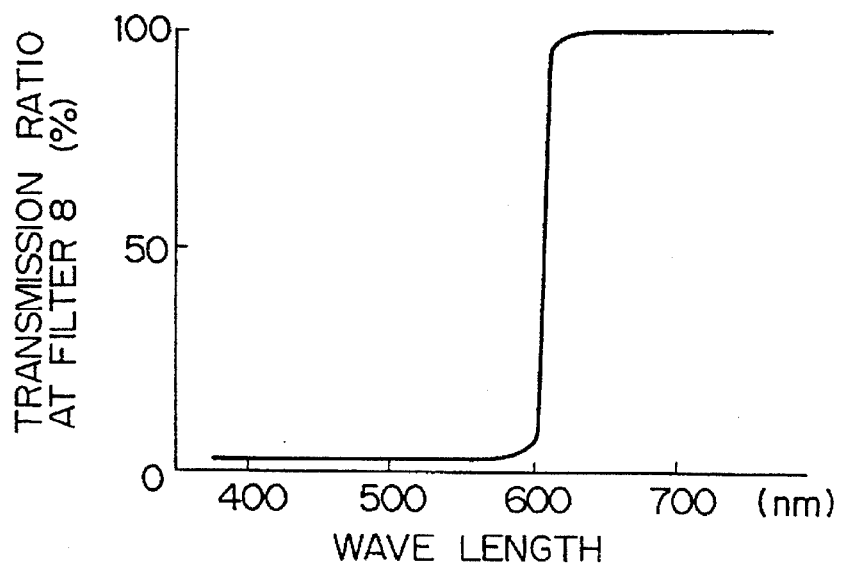
FIG. 6 is a relationship between the wavelength of the light and the transmitting of the red pass filter.

As shown in FIG. 6, the red pass filter 8 has a characteristic that the wave length larger than 600 nm is transmitted, and the wave length smaller than 600 nm is cut. The use of the red pass filter 8 together with the use of the red cut filter 7 in front of the hologram 3 allows the hologram to be illuminated only a red light, which prevents any scattering and/or diffraction of light from occurring in the hologram 3, which otherwise causes the red light to be emitted in the forward direction toward the driver, and which may dazzle the driver.

Figure 11:
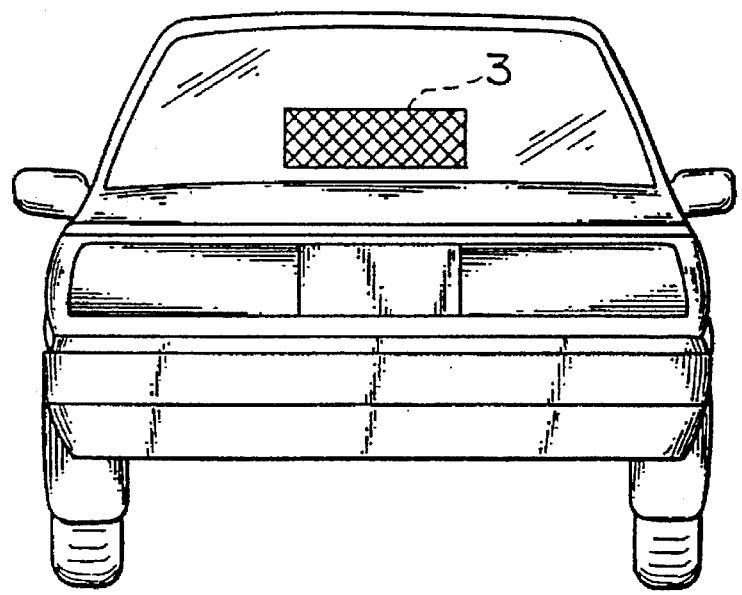
FIG. 11 shows a rear view of the automobile when the rear indicating device according to the present invention is operated.

In a well known manner, as shown in FIG. 2, the rear indicating device according to the present invention is arranged in the cabin 103 adjacent the rear window 1 of the automobile. Furthermore, a well known drive means is provided for energizing the lamp 5 when a switch (not shown) is manually operated or automatically operated by means of a braking operation of the automobile by the driver. When the lamp 5 is energized along this manner, the collimated light from the light source 8 is, first, introduced into the inlet section 4a via the plane 4a of the incidence, and, then, introduced into the second section 4c. The light from the second section 4c is introduced into the light guide plate 2. The light is transmitted through the light guide plate 2 by repeated total reflection between the opposite inner surfaces of the light guide plate 2. The light in the light guide plate 2 is a reference light and is introduced into the hologram under a particular value of the angle of incidence to illuminate it so as to obtain a reproduction of a predetermined wave length corresponding to red directed rearwardly as shown by the arrow F which is substantially horizontal. FIG. 11 shows a rear view of the automobile provided with the rear indication apparatus according to the present invention when it is energized. The energization of the lamp 5 in FIGS. 2 and 3 causes the hologram 3 to be illuminated as shown in FIG. 11, which causes a red light to be emitted rearwardly, notifying that the rear indicating device is operated.

According to the present invention, the red pass filter 8 in front of the light source 5 and red cut filter 7 in front of the hologram 3 are combined, whereby only the red light to be illuminated to the hologram for the reproduction of the hologram, and whereby any emission of the light in the forward direction by scattering is prevented. Thus, a field of view in the rear direction is not reduced irrespective of the existence of the rear indicating device.

Figure 12:
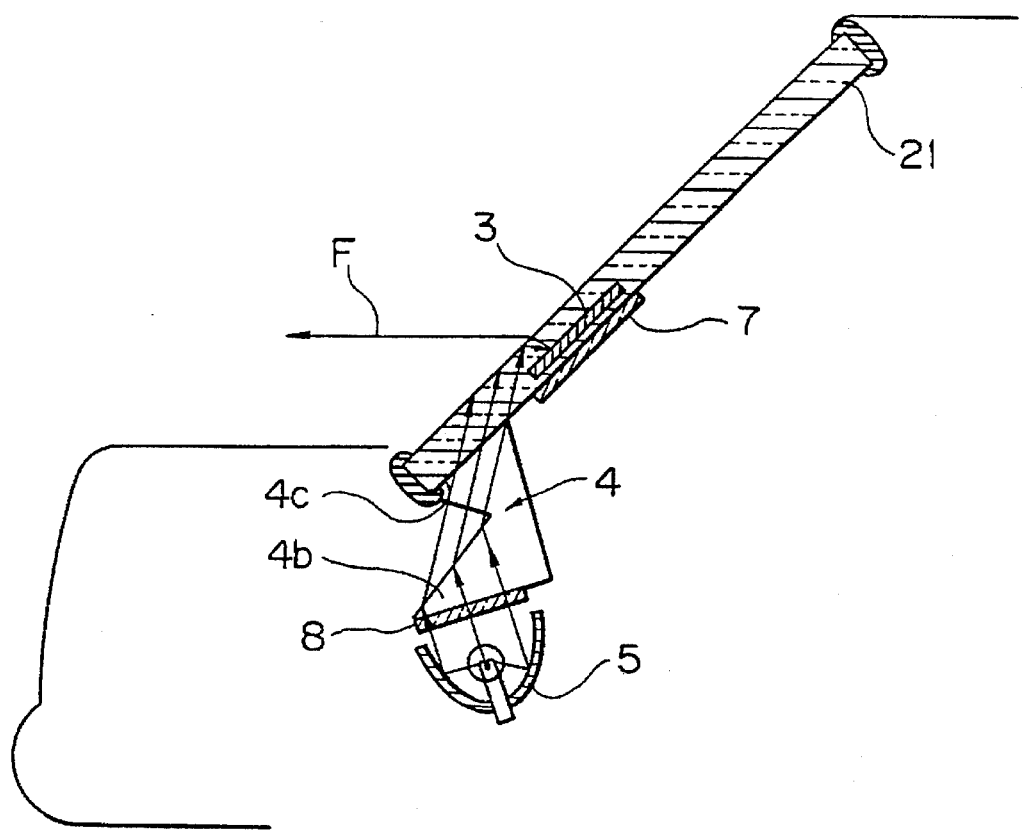
FIG. 12 shows a schematic view of a second embodiment of the rear indicating device according to the present invention.

FIG. 12 shows a second embodiment of the present invention, where the hologram 3 is embedded in the rear window 21 or is attached to the surface of the rear window 21. The rear window 21 serves, at its lower portion, also, as a light guide plate for transmitting the light beam from the light source 5 and the irregular shaped prism 4. Namely, the light from the light source 5 upon its energization is introduced, via the red pass filter 8, to the irregular shaped prism 4 to obtain a flattened light beam under a similar principle as that used in the first embodiment. Namely, a refraction of the light beam occurs at the first section 4b of the prism 4 to obtain the flattened light beam introduced into the second section 4c of the prism. The flattened beam from the prism 4 is introduced into the lower portion of the rear window 21, serving as the light guide plate, where the light beam is transmitted to the hologram 4 by a repetition of total reflection between the opposite inner surfaces of the rear window 21. The light beam is finally introduced into the hologram 3 at a predetermined angle of incidence so that a reproduction of substantially horizontally directed red light occurs, as shown by arrow F, toward the rear direction for obtaining a rear indication of the application of the brakes of the automobile. The red cut filter 7 can prevent the scattered light at the hologram 3 from being directed toward the driver.

Figure 13:
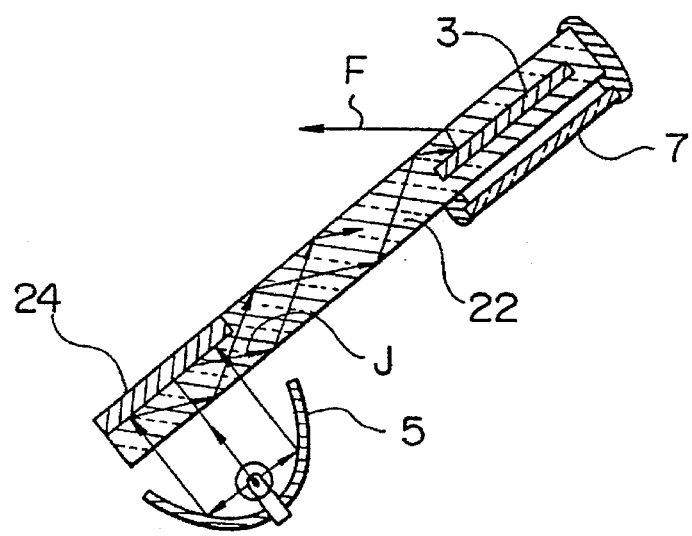
FIG. 13 shows a third embodiment.

FIG. 13 shows a third embodiment, wherein, in place of the irregular shaped prism 4, a reflection type hologram 24 is embedded in or attached to the lower part of the light guide plate 22. Namely, this hologram 24 is produced in a similar way to the hologram 3 illustrated in FIG. 9. The hologram 24 is, when illuminated by the light beam from the light source 5, for obtaining a reproduced light of a predetermined fixed wave length which is reflected along a predetermined reflection angle. An employment of such a reflection type hologram allows production of a flattened reflected light beam of a predetermined wave length which is transmitted to the hologram in the light guide plate 22 as shown by an arrow J by repeated total reflection between the opposite inner surfaces of the light guide plate 22. As a result, an effective introduction of the light from the light source 5 into the hologram 3 is obtained, irrespective of using thin rear window. Namely, upon the energization of the light source 5, the collimated light beam therefrom is introduced into the light guide plate 22 for illuminating the reflection hologram 24. A flattened light beam of a predetermined wavelength corresponding to the red is obtained along the predetermined reflection angle which is, as shown by the arrow J, transmitted inside the light guide plate up to the hologram 3 via repeated total reflections at the inner surfaces of the light guide plate 22. The transmitted light is introduced into the hologram at a predetermined angle of the incidence, so that a reflection of the red light as shown by the arrow F is obtained in the rear and horizontal direction for producing a braking indication.

Figure 14:
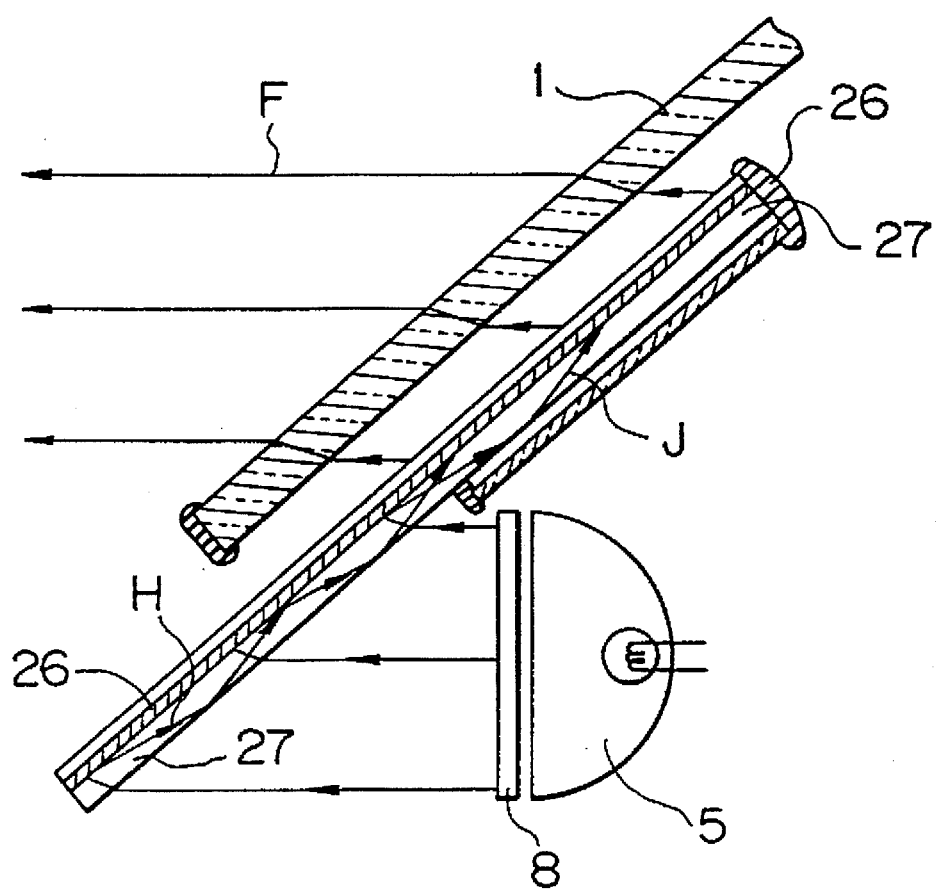
FIG. 14 shows a fourth embodiment.

FIG. 14 shows a fourth embodiment of the present invention, where the function of the hologram 3 for producing the rearwardly directed red light and the function of the reflection hologram 24 to obtained reflected flattened light beam are done by one and the same hologram 26, which is arranged inside the light guide plate 27. The hologram 26 has a first section which functions to receive the light source under a particular value of the angle of the incidence to obtain a reflected light along a particular value of reflection angle, and a second section which functions to pass through only the light introduced under a particular angle of the incidence. As similar to the preceding embodiments, the red pass filter 8 is provided in front of the light source 5.

The hologram 26 can reflect the light from the light source 5 in a particular direction in the light guide plate 27, so that the transmission of the light under the flattened sate is obtained in the light guide plate 27. Namely, the light source 5 is can be arranged so that it directly faces the inner surface of the light guide plate 27. Thus, a effective introduction of the light from the light source 5 into the light guide plate 27 is obtained.

In the rear indicating device according to this embodiment, the collimated light from the light source 5 is introduced, via the red pass filter 8, into the lower part of the light guide plate 27, so that the light is introduced into the lower section of the hologram 26 under a particular value of angle of incidence, which causes the reflection of the light to occur under a particular reflection angle as shown by an arrow H. The reflected light is transmitted in the light guide plate 27 via repeated total reflection at the opposite inner surfaces of the light guide plate 27. The light is finally introduced into the upper section of the hologram 26 at a particular value of the angle of the incidence which allows the light to be passed through the hologram 26 along the particular direction as shown by an arrow J, so that the light is directed rearwardly through the rear window 1 as shown by an arrow F. As a result, a clear, rear braking indication can be obtained.

Figure 15:
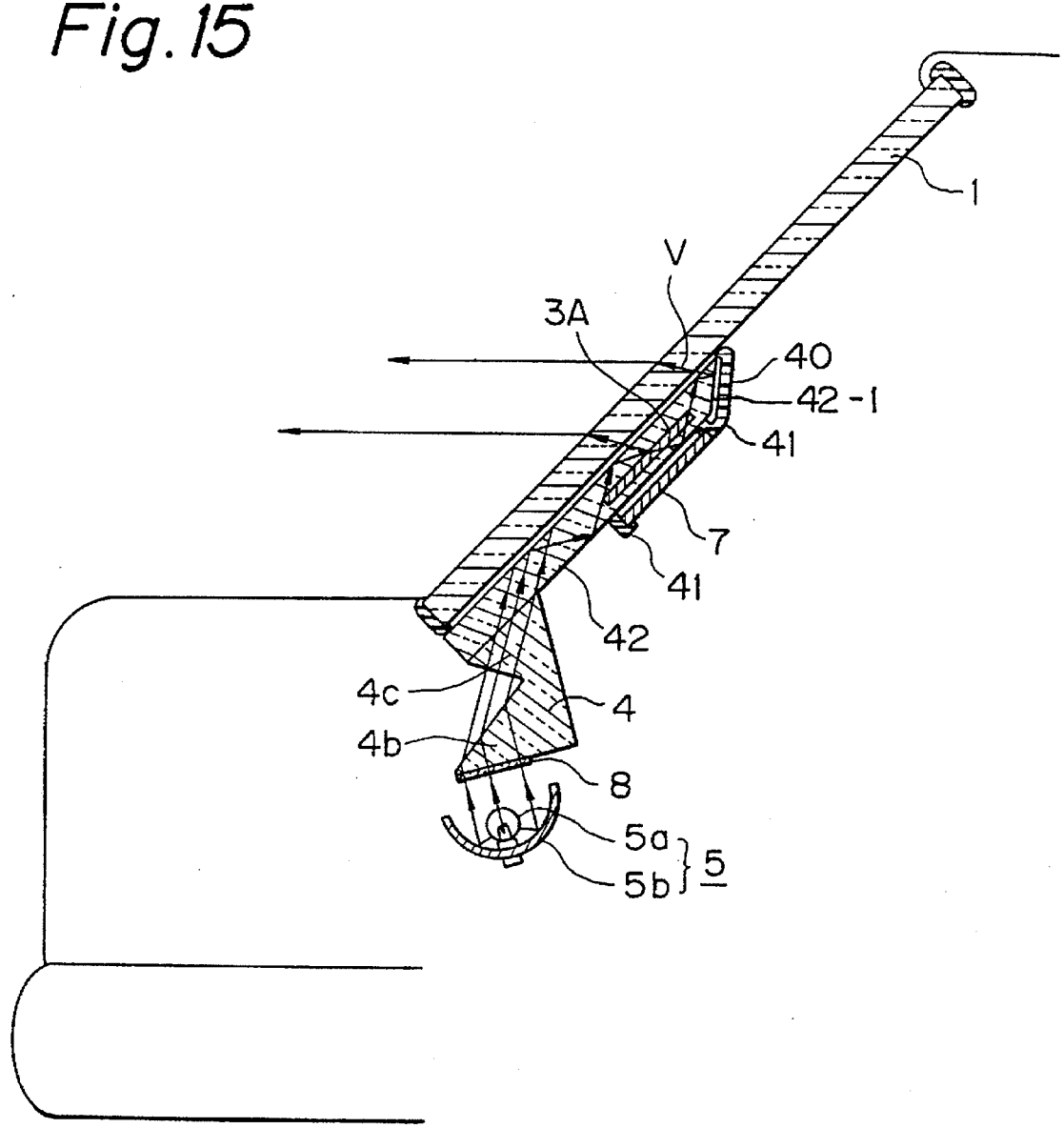
FIG. 15 shows a fifth embodiment.
Figure 16:
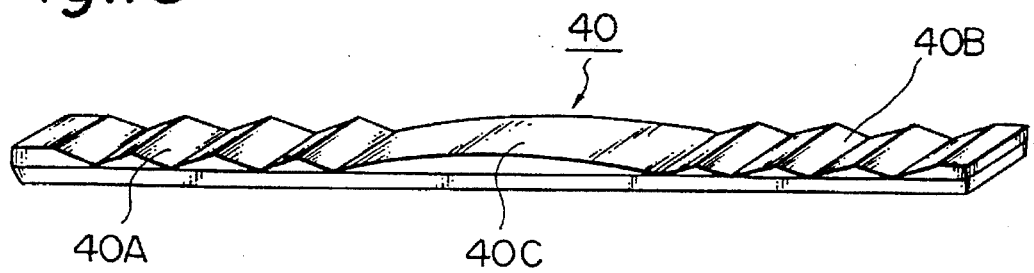
FIG. 16 is a perspective view of a reflecting plate in FIG. 15.

FIGS. 15 and 16 show a fifth embodiment, wherein a light guide plate 42 is arranged inwardly of and adjacent to the rear window 1. This embodiment includes a hologram 3A of a reflection type, where a reflection of a light is obtained along a particular direction. Furthermore, faced with the reflection type hologram 3A, a reflection plate 40 is arranged on an upper oblique edge 42-1 of the light guide plate 42. The provision of the reflection plate prevents the light passed through the hologram 3A from being emitted into the cabin. Other constructions, including the irregular shaped prism 4, the light source 5, and the red pass filter 8 are identical with the preceding embodiments.

In order to provide the reflection type hologram 3A, a transparent film with a coating of photosensitive material is prepared. A light of a particular wave length, which corresponds, for example, to red, is introduced into the film along a particular direction to expose the photosensitive material. The film is developed to obtain a hologram.

The obtained hologram 3A is embedded in or connected to the light guide plate 42. Furthermore, the red cut filter 7 is mounted on the inner side of the light guide plate 42 by means of a frame member 41 so that a small gap of a value larger than a several μm is created between the red cut filter 7 and the light guide plate 42. Filled in the gap is material of value of reflective index smaller than that of the light guide plate 42, such as water, air, or adhesive agent. Finally, the red cut filter 7 is for eliminating wavelengths larger than about 590 nm, so that the light of a wavelength smaller than 590 nm can be passed.

Similar to the first embodiment in FIGS. 2 and 3, an irregular shaped prism 4 is fixedly connected to the inner surface of the light guide plate 42 at its lower portion. Similarly, the prism 4 is constructed with a first section 4b for receiving the light beam from the light source 5 and a second section 4c for connection to the light guide plate 42. The first section 4b of the prism 4 is for obtaining a deflection of the light beam as introduced into the prism by the refraction of light, so that a flattening is occurred in the light beam. The flattened beam is again introduced into the prism 4 via the second section 4c, so that the it is introduced into the light guide plate 42. Arranged in front of the irregular shaped prism 4 is a light source 5, and a red pass filter 8 is arranged between the prism 4 and the light source 5. As similar to the firs embodiment, the light source 5 is constructed by a rod shaped lamp 5a, such as a fluorescence lamp or discharge lamp 5a, and a parabola shaped mirror 5b for generating a substantially collimated laser beam directed to the irregular shaped prism 4.

The red pass filter 8 allows the red light of wave length larger than 600 nm to pass through the filter, and prevent the light of the wave length smaller than 600 from passing through the filter 8. The combined use of the red pass filter 8 in front of the light source 5 and the red cut filter in front of the hologram 3A allows only the red light to illuminate the hologram 3A, while preventing any light from being scattered toward the driver.

As shown in FIG. 15, on the top oblique edge 42-1 of the light guide plate 42, the reflection plate 40 is arranged so that a small gap is created between the guide plate 42 and reflection plate 40. The reflection plate 40 extends along the width of the rear window, and is formed with a reflection surface having end portions 40A and 40B having repetition of projected portions of a cross sectional shape of a flattened triangle, and a middle portion 40C of a cross sectional shape convexed outwardly. Such a construction is effective for obtaining wide range of the reflection of the light mainly to the right and left directions as well as an upward direction in a rear side of the car.

During the operation of the rear indicating device according to the present invention, a collimated light beam from the light source 5 upon its energization is introduced, via the red filter 8, into the first section 4b of the prism 4 due to a refraction of the light, so that its direction is deflected to obtain a flattened light beam. The flattened light beam is again introduced into the prism 4 via the second section 4c, and is introduced into the light guide plate 42. A transmission of the light beam occurs in the light guide plate 42 due to repeated total internal reflection at the opposite inner surfaces of the plate 42. The transmitted light is introduced into the reflection type hologram 3A, whereat only the light of a predetermined value of the angle of incidence and of the predetermined wave length is reflected horizontally and is directed rearwardly from the automobile. As a result, an indication of braking of the automobile can be obtained.

Even in the case of the reflection type hologram, the light beam is not completely reflected by the hologram 3A. However, the light not reflected by the hologram 3A is directed to the top oblique edge 42-1 and reflected by the reflection plate 40 in the rear direction of the automobile as shown by an arrow V. Thus, the provision of the reflection plate 40 is effective for preventing the non-reflected light from being directed toward the driver, which may otherwise cause the driver to be dazzled. Furthermore, the provision of the reflection plate 40 can increase the amount of the light directed rearwardly, so that the brightness of the rear indication can be increased.

Figure 17:
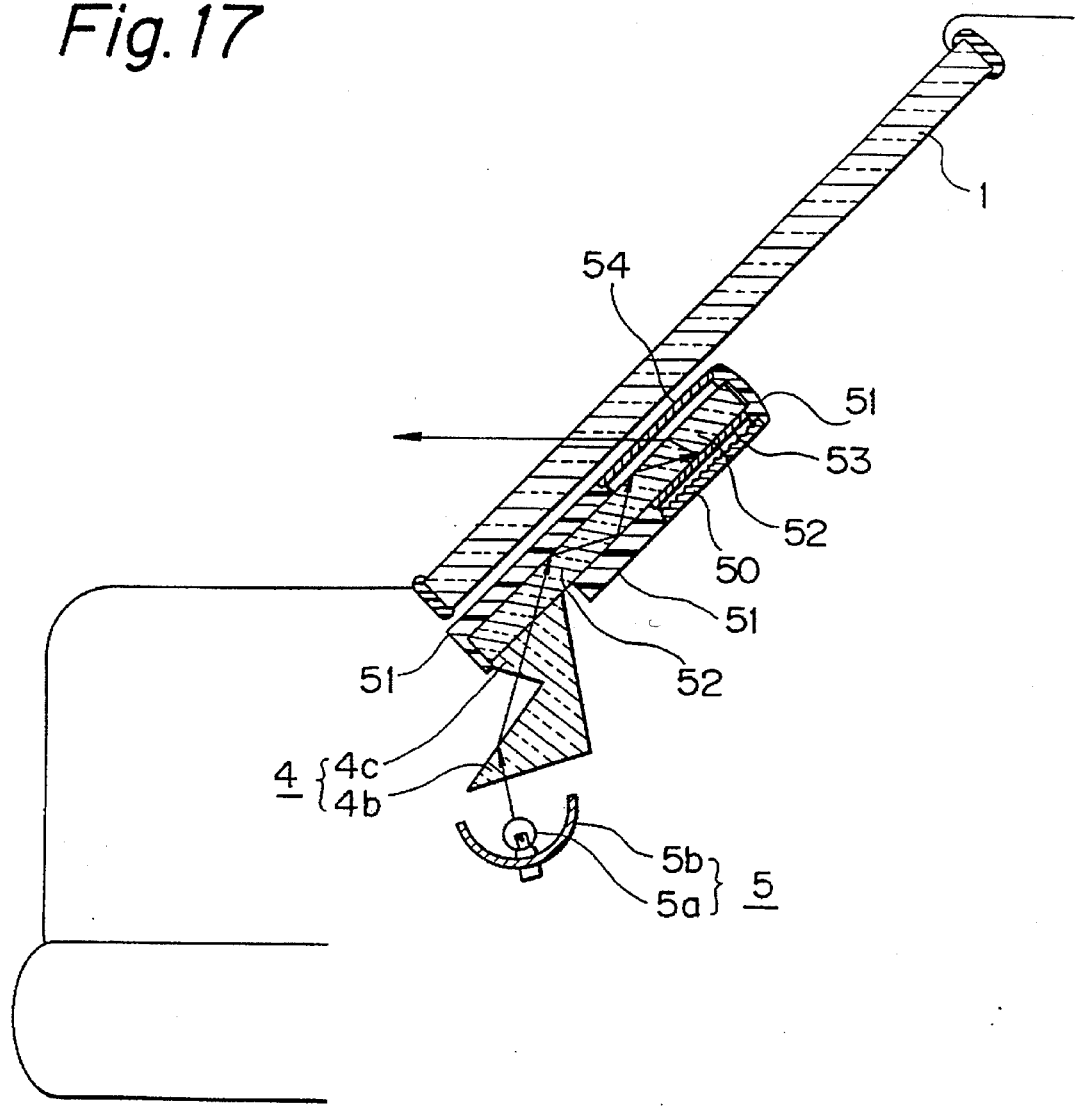
FIG. 17 shows a 6th embodiment.
Figure 18:
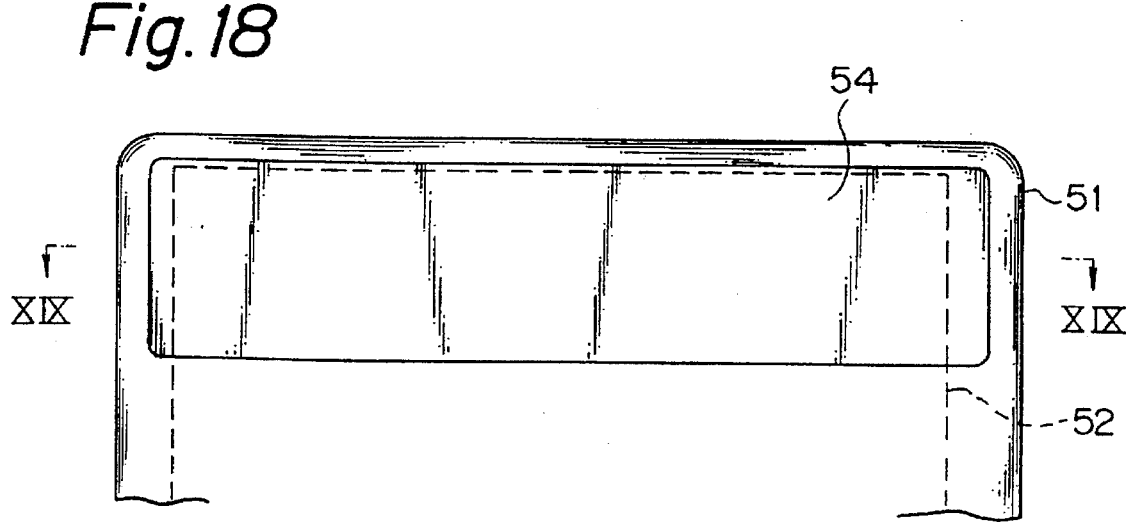
FIG. 18 is rear, elevational view of the rear indication device in FIG. 17.

FIGS. 17 to 20 is directed to a 6th embodiment, where a light guide plate 2 is arranged inwardly of and adjacent to the lower portion of the rear window 1. A frame 51 of substantially U shaped cross section is provided, in which the light guide plate 2 is arranged. A reflection type hologram 53 is arranged on the inner surface of the light guide plate 52. The frame member has an opening extending in the direction of the width of the rear window 1, and a reflection plate 50 is mounted at the opening so that the reflection plate 50 faces the hologram 53. The hologram 53 is of a reflection type, but there is a possibility that a small amount of the light can pass through the hologram 53. The reflection plate 50 prevents light from being directed into the cabin. The frame 51 has a rectangular shaped opening extending in the direction of the width of the rear window, in which a red pass filter 54 is arranged as shown in FIG. 18. The construction of the irregular shaped prism 4 and the light source 5 is substantially the same as those in the previous embodiments.

As similar to the preceding embodiment, in order to provide the reflection type hologram 53, a transparent film with a coating of photosensitive material is prepared. A light of a particular wave length, which corresponds, for example, to red, is introduced into the film along a particular direction to expose the photosensitive material. The film is developed to obtain a hologram 53. The obtained hologram 53 is connected to the inner surface of the transparent guide plats 52 by means of an adhesive agent. The red pass filter 54 is arranged to align with the hologram 53 and is spaced from the outer surface of the guide plate 52 so as to crate a gap between the red filter 54 and the light guide plate 52. Filled in the gap is a material which has a refractive index of a value smaller than that of the light guide plate, such as water, air or adhesive agent. The red pass filter 54 has a characteristic that the light of wave length larger than 600 nm can be passed, while remaining visible light is cut. Similar to the preceding embodiments, the irregular shaped prism 4 has a first section 4b for deflecting the light beam from the light source 5 for flattening the light beam, and a second section 4c for receiving the flattened light beam and directing it to the light guide plate 52. Similar to the preceding embodiment, the light source 5 is constructed by a rod shaped lamp 5a, such as a fluorescence lamp or discharge lamp 5a, and a parabola shaped mirror 5b for generating a substantially collimated laser beam directed to the irregular shaped prism 4.

Figure 20:
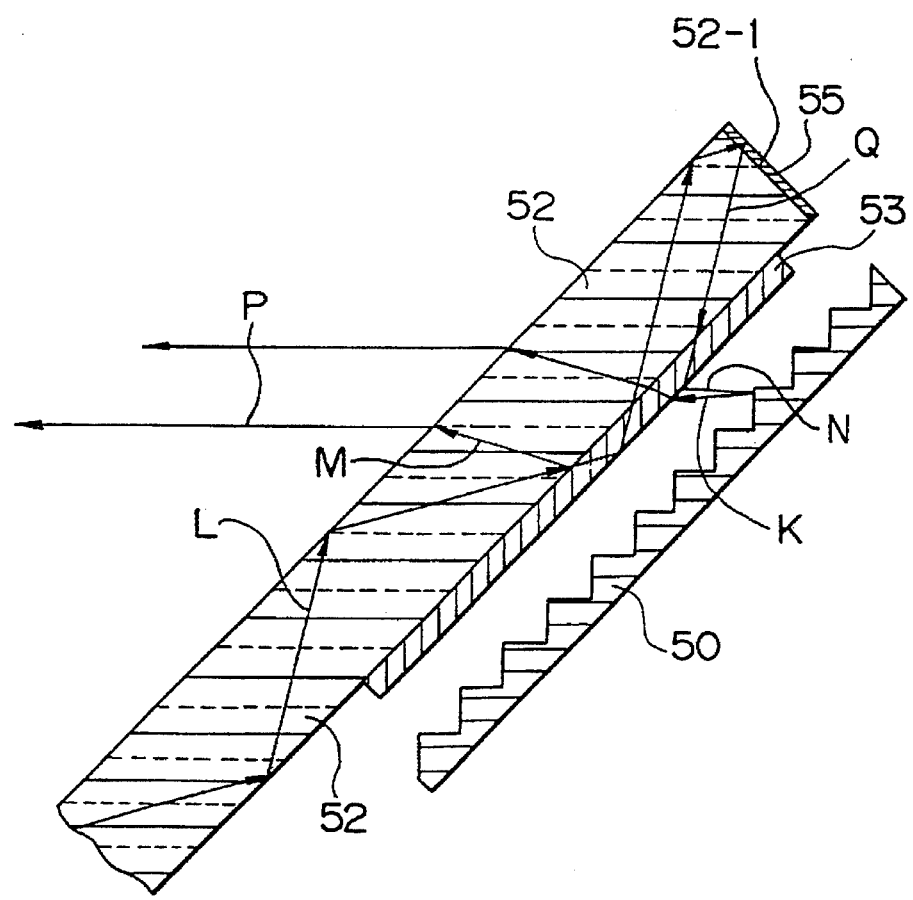
FIG. 20 is an enlarged view of the light guide plate and the reflection plate in FIG. 19.

As shown in FIG. 20, the reflecting plate 50 is arranged to face the inner surface of the hologram 53 so as to provide a gap between the reflection plate 50 and the hologram 53. The surface of the reflecting plate 50 facing the hologram has a serrated cross sectional shape in such a manner that the light beam passed through the hologram 53 is reflected horizontally in the rear direction as will be explained later. Furthermore, a reflected layer 55 is provided at the top edge 52-1 of the light guide plate 52.

The rear indicating device in FIG. 17 is employed as a high-mount type stop lamp wherein it is arranged inside the cabin at the location adjacent the lower portion of the rear window 1. In this case, the light source 5 and the prism 4 is arranged below a rear shelf formed at the rear end of the cabin of the automobile.

Figure 19:
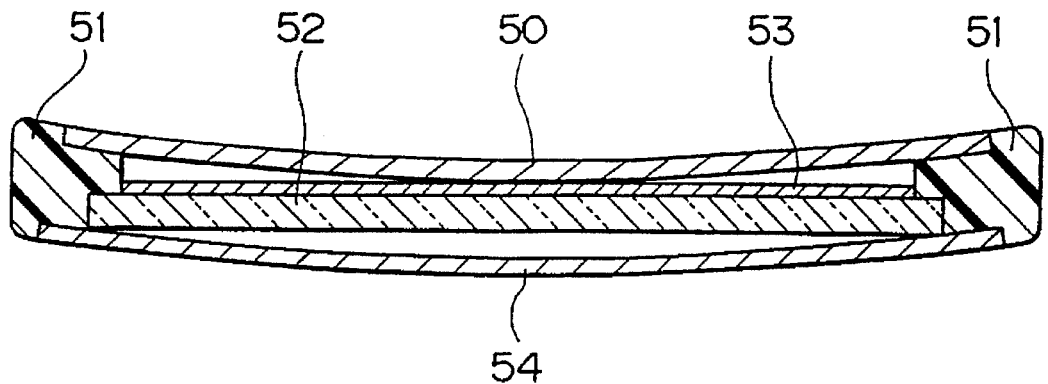
FIG. 19 is a cross sectional view taken along line IXX—IXX in FIG. 18.

As shown in FIG. 19, the red pass filter 54 and the reflection plate 50 is slightly convexed outwardly so as to conform with the convexed shape of the rear window 1.

When the light source 5 is lit, collimated light from the light source 5 is introduced into the first section 4b of the prism, whereat the light beam is refracted to obtain a flattened light beam. The flattened beam is again introduced to the prism 4 at its second section 4c, and is introduced into the light guide plate 52. The light beam is, then, transmitted inside the light guide plate 52 while repeating total reflection, and is finally introduced, as a reference light, into the hologram as shown by the arrow L in FIG. 20. As a result, at the hologram, a refection or diffraction of the light only in the particular direction and of the particular wave length occurs, so that the reflected light is directed, via the red pass filter 54, rearwardly and horizontally as shown by the arrow P. A stop indication at the rear of the automobile is thus obtained.

Upon the transmission of the light beam in the light guide plate 52, the light beam is introduced into the hologram 53.

A part of the light beam is reflected at the surface of the hologram adjacent the light guide plate 52 as shown by the arrow M, and is remaining part of the light beam is passed through the hologram plate 53 and is reflected at the surface of the hologram 53 remote from the light guide plate. Such reflections are repeated along the light guide plate 52, and most of the light beam is reflected rearwardly as shown by the arrows P. The light beam not diffracted rearwardly is finally reaches the reflecting layer 55 provided at the edge 52-1 of the light guide plate as shown by an arrow Q toward the hologram 53. However, this direction of the light beam as shown by the arrow Q is not the direction which makes it to be reflected rearwardly. Thus, the beam as shown by the arrow Q passes thorough the hologram 53 and is diffracted forwardly as shown by the arrow N. However, the provision of the reflection plate 50 allows the light beam as shown by the arrow K to be reflected rearwardly as shown by the arrow K. The light beam as reflected at the reflection plate 50 is passed thorough the hologram 53 and then the light guide plate in the rear direction.

When the reflection type hologram 53 is used, a fraction of the light beam from the light source is passed through the hologram 53 forwardly with being reflected rearwardly as intended. However, the employment of the reflection plate 50 can reflect such a fraction of the light passed through the hologram 53 toward the rear direction of the automobile. As a result, the brightness of the indicator can be increased.

FIG. 21 shows, with respect to the wave length, the specific sensitivity f of eyes of a human, and spectral distribution g when a standard light (indicator light) is used. A brightness sensed by a human upon seeing the indication light becomes a product of the specific sensitivity curve f and the spectral distribution curve g, and is shown by a curve S in FIG. 21.

According to the regulation, a stopping lamp for an automobile must produce a red light of wave length larger than 600 nm. In view of this, when the hologram used in such a stopping lamp is produced, the optical system as shown in FIG. 9 is used, wherein a plate is exposed to the monochromatic red light to obtain a hologram. Thus, when the rear indication apparatus is operated, the light as obtained has a very limited wave range about the central wave length of 620 nm, as shown by a curve e in FIG. 21. The use of such a light of a very narrow range of wave length as obtained by a reflection at the hologram according to the present invention may generate a difficulty in that the brightness is small. In order to obviate this problem, light of different wave length is emitted from the same hologram in order to increase the total amount of the light. In case of the rear indication device used as a braking indication lamp, the wave length of the reproduced and diffraction light must be larger than 600 nm. This means that the hologram to be produced is such that, in addition to the diffraction light as shown by the curve e, a different diffraction light of wave length, between the curves 3 and S should be reflected. When producing such a hologram having different wave length, the optical system as shown in FIG. 9 can be basically employed, and a monochromatic red light is exposed to the hologram plate. However, the way for exposure is as follows. Namely, first, using the optical system as shown in FIG. 9, a laser light of a wave length of, for example, 620 nm is obtained from the laser generator 10, so that the hologram plate 3a is exposed by the collimated reference light passed through the lens 15 and the object light passed through the lens 18. In this case, the angle of the incidence of the reference light and the object light are such that the direction of the reflection light upon the reproduction of the hologram as produced is in a range between 10 degree in vertical and lateral directions with respect to the horizontal, central axis of the automobile directed rear thereof. Namely, the light as reflected is directed to the central portion. Next, an additional exposure is done by changing the angle of the incidence of the reference light and object light to the hologram dry plate. The angle is such that the wave length of the reproduced, diffracted light is 660 nm as determined by a Bragg's condition. In this case, the angle of the incidence of the reference light and the object light to the hologram dry plate is changed several times so that the angle of the reflected light upon the reproduction process of the hologram is within a range of 10 to 40 degree in lateral direction with respect to the central axis of the automobile in the rear direction thereof. Namely, the light is directed to the peripheral area.

When such a hologram is used in the rear indicator device as shown in FIG. 2 according to the present invention, a red light of a wave length of about 620 nm is visually recognized when the indication surface of the device is viewed at its center of the field of view in the rear direction of the car. Contrary to this, a red light of a wave length of about 660 nm is visually recognized when the indication surface of the device is viewed at a periphery of the field of view in the rear direction of the car. Thus, an increase in the field of the view in the rear direction of the car is obtained without reducing the brightness of the indication surface. Namely, a capability for a visual recognition of the rear indication device can be increased without increasing the brightness of the light source.

It should be noted that the rear indication device in FIGS. 17 to 20 is advantageous in that a large indication surface (light emitting surface) producing a uniform and bright light is obtained, and this can be suitably used for a surface light source such as for a back-light device for a liquid crystal type display system.

We claim:
1. An indication device:
   a light source for creating a light beam;
   a hologram arranged to receive the light beam from the light source;
   guiding plate means formed as a plate made of transparent material of a predetermined thickness, the plate means being for guiding the light beam from the light source to the hologram for introducing the light beam into the hologram at a desired angle of incidence to emit a light beam from the hologram, which is directed to a predetermined direction, and;
   means for flattening the light beam transmitted to the hologram substantially in the direction of the thickness of the guiding plate means.

2. A device according to claim 1, wherein said flattening means comprise a irregular shaped prism having a first section for deflecting the direction of the light beam from the light source by means of a refraction of light to flatten the light beam substantially in the direction of the thickness of the guiding plate means, and a second section for receiving the flattened beam, the second section being in face to face contact with the guiding plate for introducing the flattened beam into the guiding plate means.

3. A device according to claim 1, wherein said flattening means comprise an additional hologram arranged in the guiding plate means for receiving the light beam from the light source to reflect light at a particular angle which is transmitted through the guide plate toward the first hologram.

4. A device according to claim 1, wherein said hologram is constructed such that the wavelength of the reproduced light is different between its central portion and its peripheral portion.

5. A device according to claim 2, further comprising a filter arranged between the light source and the irregular prism for allowing a transmission of wavelength of a desired range.

6. A device according to claim 1, further comprising a filter arranged on one side of the guiding means for preventing, the light of a predetermined wave length range from the hologram, from being directed opposite to said predetermined direction.

7. A rear indication device for an automobile comprising:
   a light source for creating a light beam;
   a hologram subjected to an illumination by the light beam for a rear indication;
   a light guide plate for guiding the light beam from the light source to the hologram, and;
   an irregular shaped prism arranged between the light source and an end of the light guide plate, the prism being arranged in face to face contact with the light guide plate in such a manner that the light beam from the light source is flattened substantially in the direction of the thickness of the light guide plate and that the flattened beam is transmitted inside along the light guide plate into the hologram at a desired angle of incidence to reproduce a light beam at the hologram, which is directed to the rear direction of the automobile.

8. A rear indication device for an automobile having a rear window, said device comprising:
   a light source for creating a light beam;
   a hologram subjected to an illumination by the light beam for a rear indication, and;
   an irregular shaped prism arranged between the light source and an end of the rear window, the prism being arranged in face to face contact with the rear window in such a manner that the light beam from the light source is flattened substantially in the direction of the thickness of the rear window and the flattened light beam is transmitted inside along the rear window into the hologram at a desired angle of incidence to reproduce a light beam at the hologram, which is directed to the rear direction of the automobile.

9. A rear indication device for an automobile comprising:
   a light source for creating a light beam;
   a hologram subjected to an illumination by the light beam for a rear indication;
   a light guide plate for guiding the light beam from the light source to the hologram, and;
   a second hologram of a reflection type arranged in one end of the light guide plate for receiving the light beam from the light source, the second hologram reflecting the light beam from the light source so as to transmit the beam inside the light guide plate into the first hologram, while the light beam is flattened substantially in the direction of the thickness of the light guide plate and that the flattened beam is introduced into the first hologram at a desired angle of incidence to reproduce a light beam at the hologram, which is directed to the rear direction of the automobile.

10. A rear indicator device for an automobile comprising:
    a light source for creating a light beam;
    a light guide plate, and;
    a hologram arranged in said light guide plate having a first section receiving the light beam from the light source for reflecting the light beam in a particular angle allowing the reflected beam to be transmitted inside along the light guide beam while the light beam is flattened substantially in the direction of the thickness of the light guide plate;
    the hologram having a second section to which the beam from the first section is introduced at a particular angle of incidence to reproduce a light beam at the hologram, which is directed to the rear direction of the automobile.

11. A rear indication device for an automobile comprising:
    a light source for creating a light beam;
    a reflection type hologram subjected to an illumination by the light beam for a rear indication;
    a light guide plate for guiding the light beam from the light source to the hologram for introducing the light beam into the hologram at a desired angle of incidence to reproduce a light beam at the hologram, which is directed to the rear direction of the automobile;
    means for flattening the light beam transmitted in the light guide plate to the hologram substantially in the direction of the thickness of the guiding plate means, and;
    a reflecting plate provided at the edge of the light guide plate adjacent the hologram for reflecting, toward the rear direction of the automobile, the light beam passed through the hologram and emitted from the edge outwardly.

12. A rear indicator device for an automobile comprising:
    a light source for creating a light beam;
    a reflection type hologram subjected to an illumination by the light beam for a rear indication;
    a light guide plate for guiding the light beam from the light source to the hologram which introduces the light beam into the hologram at a desired angle of incidence to reproduce a light beam at the hologram, which is directed to the rear direction of the automobile;
    means for flattening the light beam transmitted in the light guide plate to the hologram substantially in the direction of the thickness of the guiding plate means, and;
    a reflecting plate provided to face the front surface of the light guide plate for reflecting, toward the rear direction of the automobile, the light passed through the hologram in the forward direction of the automobile.

* * * * *